US011946305B2

(12) United States Patent
Dallmann et al.

(10) Patent No.: US 11,946,305 B2
(45) Date of Patent: Apr. 2, 2024

(54) WINDOW OPERATOR HANDLE AND COVER WITH MAGNETIC SECURING FEATURES AND DETENT

(71) Applicant: Truth Hardware Corporation, Owatonna, MN (US)

(72) Inventors: Brian Dallmann, Owatonna, MN (US); Eric Fickas, Plain City, OH (US); Jonathan P. Hickman, Rochester, MN (US); Gregory J. Vetter, Owatonna, MN (US)

(73) Assignee: Truth Hardware Corporation, Owatonna, MN (US)

( * ) Notice: Subject to any disclaimer, the term of this patent is extended or adjusted under 35 U.S.C. 154(b) by 0 days.

(21) Appl. No.: 17/859,464

(22) Filed: Jul. 7, 2022

(65) Prior Publication Data

US 2022/0341237 A1 Oct. 27, 2022

Related U.S. Application Data

(63) Continuation-in-part of application No. 17/728,728, filed on Apr. 25, 2022.

(60) Provisional application No. 63/178,818, filed on Apr. 23, 2021.

(51) Int. Cl.
*E05F 11/16* (2006.01)
*E05F 11/22* (2006.01)

(52) U.S. Cl.
CPC .............. *E05F 11/16* (2013.01); *E05F 11/22* (2013.01); *E05Y 2201/47* (2013.01); *E05Y 2201/68* (2013.01)

(58) Field of Classification Search
CPC ............. E05Y 2201/47; E05Y 2201/68; E05Y 2900/148; Y10T 74/20744; Y10T 292/57; E05F 11/08-32
See application file for complete search history.

(56) References Cited

U.S. PATENT DOCUMENTS

| | | | | |
|---|---|---|---|---|
| 3,520,487 | A * | 7/1970 | Quenot | G01B 3/1005 242/395.1 |
| 5,400,473 | A * | 3/1995 | Delman | E05F 11/16 74/545 |
| 5,443,570 | A * | 8/1995 | Hirano | A01K 89/006 242/284 |
| 5,467,503 | A * | 11/1995 | Nolte | E05F 11/34 74/557 |
| 6,640,389 | B2 * | 11/2003 | Van Klompenburg | E05F 11/16 49/339 |
| 7,066,505 | B2 * | 6/2006 | Van Klompenburg | E05F 11/16 292/336.3 |
| 7,194,930 | B2 * | 3/2007 | Dawson | E05B 1/0092 242/283 |

(Continued)

OTHER PUBLICATIONS

Co-pending U.S. Appl. No. 17/728,728, filed Apr. 25, 2022, and entitled "Window Operator Handle and Cover With Magnetic Securing Features."

*Primary Examiner* — Justin B Rephann
(74) *Attorney, Agent, or Firm* — Bradley J. Thorson

(57) ABSTRACT

A window operator handle and cover with magnetic features that enable the handle to be retained to the cover in a folded position. The handle can have a detent mechanism to retain the handle in an unfolded position. The operator cover can also be attached to the operator with magnets.

22 Claims, 16 Drawing Sheets

(56) References Cited

U.S. PATENT DOCUMENTS

| | | | | |
|---|---|---|---|---|
| 7,251,860 | B2 * | 8/2007 | Liang | E05F 11/16 74/547 |
| 7,464,619 | B2 | 12/2008 | Vetter | |
| 9,003,706 | B2 * | 4/2015 | Meves | E05F 9/00 49/246 |
| D913,783 | S | 3/2021 | Nolte | |
| 2005/0212305 | A1 * | 9/2005 | Gill | E05F 11/16 292/336.3 |
| 2006/0260099 | A1 * | 11/2006 | Liang | E05F 11/16 16/429 |
| 2008/0066382 | A1 * | 3/2008 | Erickson | E05B 13/10 49/246 |
| 2013/0312331 | A1 * | 11/2013 | Bourgoin | E05F 11/10 49/386 |
| 2014/0026709 | A1 * | 1/2014 | Derham | E05F 11/24 74/528 |
| 2014/0069016 | A1 * | 3/2014 | Perry | E05F 15/40 49/31 |
| 2019/0383069 | A1 * | 12/2019 | Guelck | E05C 17/505 |
| 2020/0263475 | A1 * | 8/2020 | Hollermann | E05F 11/02 |

* cited by examiner

WINDOW OPERATOR HANDLE AND COVER WITH MAGNETIC SECURING FEATURES AND DETENT

RELATED APPLICATION

The present application is a continuation-in-part of U.S. application Ser. No. 17/728,728, filed Apr. 25, 2022, which claims the benefit of U.S. Provisional Application No. 63/178,818 filed Apr. 23, 2021, both of said applications being hereby fully incorporated herein in their entirety by reference.

TECHNICAL FIELD

This application relates to window operator handles and covers, and more specifically to casement and awning window operator handles and covers.

BACKGROUND

Casement and awning windows are typically opened and closed with a rotary operator. The windows have a frame that forms an opening in a wall of a structure, and a sash is hinged to the frame to open and close the opening. The operator enables a user to drive the sash between open and closed positions, typically by a crank handle. An example of such an operator is disclosed in U.S. Pat. No. 7,464,619, owned by the owners of the present application, and hereby fully incorporated herein by reference.

The operator mechanism visible from the interior is typically concealed under an operator cover. A folding crank handle is engaged with a splined shaft of an operator drive via an adapter, and the handle may be secured in place on the cover by a feature formed in the cover. An example of such a handle and operator cover is disclosed in U.S. Design Pat. No. D913,783, owned by the owners of the present application, and hereby fully incorporated herein by reference.

A drawback of prior operator handles and covers, however, is that the folding handles are held in the closed position by mechanical methods, physical ledges, or pockets on the cover which engage with the handle or features on the handle. This can lead to dirt and dust collecting in the handle or cover features, difficulty for a user to ensure that the handle is properly engaged in the cover upon completing opening and closing of the window, and a cluttered aesthetic appearance to the handle and cover overall. Also, if cover recesses are used for the handle, the user can have difficulty grasping the handle with their fingers to extract the handle from a recess to operate the handle.

Moreover, the operator cover is usually attached to the operator with one or more mechanical pins, latches, or snap features. These mechanical attachment methods caul be difficult to manipulate if it becomes necessary to detach the operator cover from the operator, and can be inadvertently broken.

What is needed is an operator handle and cover assembly that addresses the drawbacks of prior devices.

SUMMARY OF THE DISCLOSURE

The inventions described in the present application address the drawbacks of prior devices by providing a handle that is secured in place on an operator cover with magnetic features, thereby eliminating the need for mechanical securing features, such as projections or recesses in either the handle or the cover. Further, since the handle is not received in a recess of the cover, the handle is easier for a user to grasp in order to unfold it into a position for operating the handle.

Magnetic features enable the handle to be positioned with a smoother appearance to the cover and help the handle self-locate to the cover. This means the user does not need to be as careful when folding the handle down and positioning the handle for storage. The magnets also secure the handle from falling away due to gravity from the cover into a drooping position.

In embodiments, the operator cover can also be attached to the operator with magnets. In such embodiments, the operator cover can be easily detached from the operator by simply pulling the cover away from the operator.

In embodiments, the handle can be provided with a detent mechanism arranged to retain the handle in the unfolded position According to an embodiment, a window operator handle and cover assembly includes a shell adapted to be received on a window operator, the shell having a first magnetic handle securing component, and a handle portion adapted to couple with a rotatable drive of the window operator, the handle portion being shiftable between a folded position in which a lower surface of the handle portion abuts an outer surface of the shell and an unfolded position in which the lower surface of the handle portion is spaced apart from the outer surface of the shell. The handle portion has a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position.

The first magnetic handle securing component and the second magnetic securing component can each be magnets, or one of the first magnetic handle securing component or the second magnetic handle securing component can be a magnet and the other of the first magnetic handle securing component and the second magnetic handle securing component can be ferrous metal. At least one of the first magnetic handle securing component and the second magnetic handle securing component can be a neodymium magnet.

In embodiments, the shell can define a recess adapted to receive a portion of the window operator, a housing defining a cavity being disposed within the recess, the first magnetic handle securing component being received in the cavity. The handle portion can include a body defining a recess, a housing defining a cavity being disposed within the recess, the first magnetic handle securing component being received in the cavity. The handle portion can include a bottom cover at least partially covering the recess in the body.

In further embodiments, the shell can include a plurality of magnetic cover securing components, each one of the plurality of first magnetic cover securing components disposed so as to correspond with a separate one of a plurality of second magnetic cover securing components disposed on the window operator. A mutual magnetic attraction between each of the first magnetic cover securing components and the corresponding second magnetic cover securing component secures the cover portion to the window operator.

In an embodiment, a window operator assembly includes a window operator adapted to couple with a movable sash of a window, and a window operator handle and cover assembly. The window operator handle and cover assembly can include a shell received on the window operator, the shell having a first magnetic handle securing component, and a handle portion coupled with a rotatable drive of the window operator. The handle portion is shiftable between a folded position in which a lower surface of the handle portion abuts an outer surface of the shell and an unfolded position in which the lower surface of the handle portion is spaced apart from the outer surface of the shell. The handle portion has a second magnetic handle securing component disposed proximate the first magnetic handle securing component when the handle portion is in the folded position. A mutual magnetic attraction between the first magnetic handle securing component and the second magnetic handle securing component secures the handle portion in the folded position.

The first magnetic handle securing component and the second magnetic handle securing component can each be magnets, or one of the first magnetic handle securing component or the second magnetic handle securing component can be a magnet and the other of the first magnetic handle securing component and the second magnetic handle securing component can be ferrous metal. At least one of the first magnetic handle securing component and the second magnetic handle securing component can be a neodymium magnet.

In embodiments, the shell can define a recess receiving a portion of the window operator, a housing defining a cavity being disposed within the recess, the first magnetic handle securing component being received in the cavity. The handle portion can include a body defining a recess, a housing defining a cavity being disposed within the recess, the first magnetic handle securing component being received in the cavity. A bottom cover can at least partially cover the recess in the body.

In further embodiments, the shell can include a plurality of magnetic cover securing components, each one of the plurality of first magnetic cover securing components disposed so as to correspond with a separate one of a plurality of second magnetic cover securing components disposed on the window operator, wherein a mutual magnetic attraction between each of the first magnetic cover securing components and the corresponding second magnetic cover securing component secures the cover portion to the window operator.

In embodiments, a window operator handle and cover assembly includes a shell adapted to be received on a window operator, the shell having a first magnetic handle securing component, a handle assembly including a handle body and an operator drive interface adapted to couple with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position, and a detent mechanism operably coupled with the operator drive interface and the handle body, the detent mechanism providing a detent stop to maintain the handle assembly in the unfolded position.

In embodiments of the window operator handle and cover assembly, the detent mechanism includes a cam operably coupled to the operator drive interface and a spring operably coupled to the handle body. The cam can define an upper surface and a flat portion with a ridge separating the upper surface and flat portion, and the spring can present a follower portion. The spring biases the follower portion against the upper surface of the cam when the handle body is in the folded position, and the spring biases the follower portion against the flat portion of the cam when the handle body is in the unfolded position. The spring can be received in a recess defined in the handle body.

In embodiments of the window operator handle and cover assembly, the operator drive interface defines a notch and the cam is received in the notch. The rotatable drive can present a splined shaft and the operator drive interface can define a splined recess engaged with the splined shaft. The handle body and the operator drive interface can be coupled with a pin.

In embodiments of the window operator handle and cover assembly, the cam is a cam insert defining an upper surface and a flat portion with a ridge separating the upper surface and flat portion, the cam insert having a pair of projections with each one of the projections being received in a separate one of a pair of recesses defined in the operator drive interface. The spring presents a follower portion, and the spring biases the follower portion against the upper surface of the cam insert when the handle body is in the fielded position, and the spring biases the follower portion against the flat portion of the cam insert when the handle body is in the unfolded position.

In embodiments of the window operator handle and cover assembly, the handle body defines a recess, and the handle assembly further includes a bottom cover insert received in the recess. The spring, defines a serrated notch, the bottom cover insert has a pair of serrated lower walls, and the bottom cover insert is attached to the spring and handle body by engagement of the serrated lower walls with the serrated notch.

In embodiments of the Window operator handle and cover assembly, the detent mechanism can include a notch in the operator drive interface and a spring operably coupled to the handle body, the spring having a protrusion engaged in the notch when the handle assembly is in the unfolded position.

In further embodiments, a window operator assembly includes a window operator adapted to couple with a movable sash of a window, and a window operator handle and cover assembly. The window operator handle and cover assembly includes a shell adapted to be received on a window operator, the shell having a first magnetic handle securing component, a handle assembly including a handle body and an operator drive interface coupled with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position. The assembly can further include a detent mechanism operably coupled with the operator drive interface and the handle body, the detent mechanism providing a detent stop to maintain the handle assembly in the unfolded position.

In embodiments, the detent mechanism can include a cam operably coupled to the operator drive interface and a spring operably coupled to the handle body. The cam can define an upper surface and a flat portion with a ridge separating the upper surface and flat portion, the spring can present a follower portion, wherein the spring biases the follower portion against the upper surface of the cam when the handle body is in the folded position, and the spring biases the follower portion against the flat portion of the cam when the handle body is the unfolded position. The spring can be received in a recess defined in the handle body.

In embodiments of the window operator assembly, the cam is a cam insert defining an upper surface and a flat portion with a ridge separating the upper surface and flat portion, the cam insert having a pair of projections with each one of the projections being received in a separate one of a pair of recesses defined in the operator drive interface. The spring presents a follower portion, and the spring biases the follower portion against the upper surface of the cam insert when the handle body is in the folded position, and the spring biases the follower portion against the flat portion of the cam insert when the handle body is in the unfolded position.

In embodiments of the window operator assembly the handle body defines a recess, and the handle assembly further includes a bottom cover insert received in the recess. The spring defines a serrated notch, the bottom cover insert has a pair of serrated lower walls, and the bottom cover insert is attached to the spring and handle body by engagement of the serrated lower walls with the serrated notch.

In embodiments of the window operator assembly, the detent mechanism includes a notch in the operator drive interface and a spring operably coupled to the handle body, the spring having a protrusion engaged in the notch when the handle assembly is in the unfolded position.

In embodiments of the window operator assembly, the operator drive interface can define a notch with the cam received in the notch. The rotatable drive can present a splined shaft and the operator drive interface can define a splined recess engaged with the splined shaft. The handle body and the operator drive interface can be coupled with a pin.

The summary above is not intended to describe each illustrated embodiment or every implementation of the present disclosure. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which.

Figure 1:
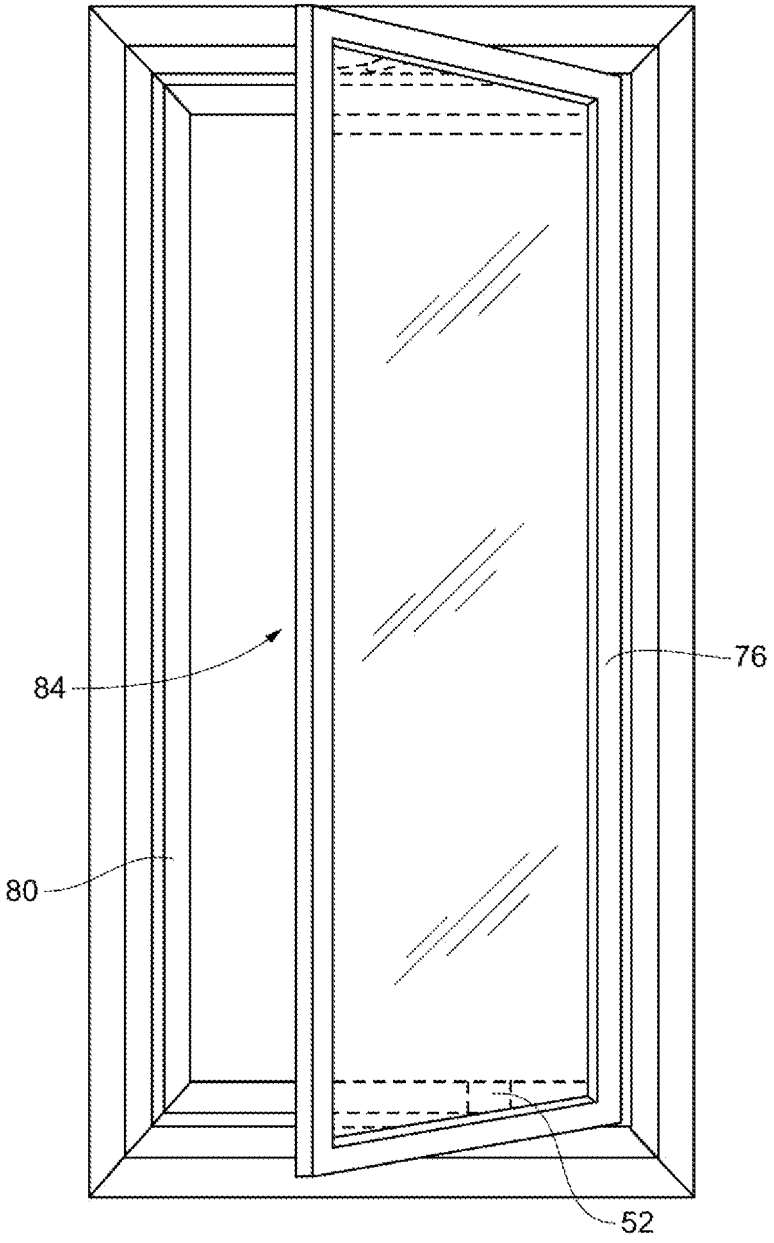
FIG. 1 is an outside elevation view of a casement window with an operator having an operator cover and handle according to embodiments of the invention.
Figure 2:
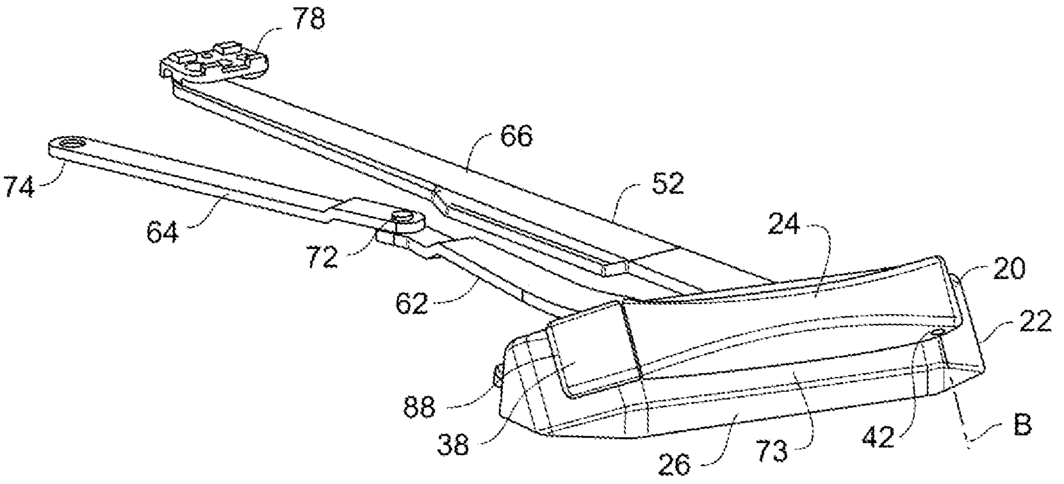
FIG. 2 is a front isometric view of an operator cover and handle according to an embodiment of the invention, with the operator cover and handle attached to an operator.
Figure 3:
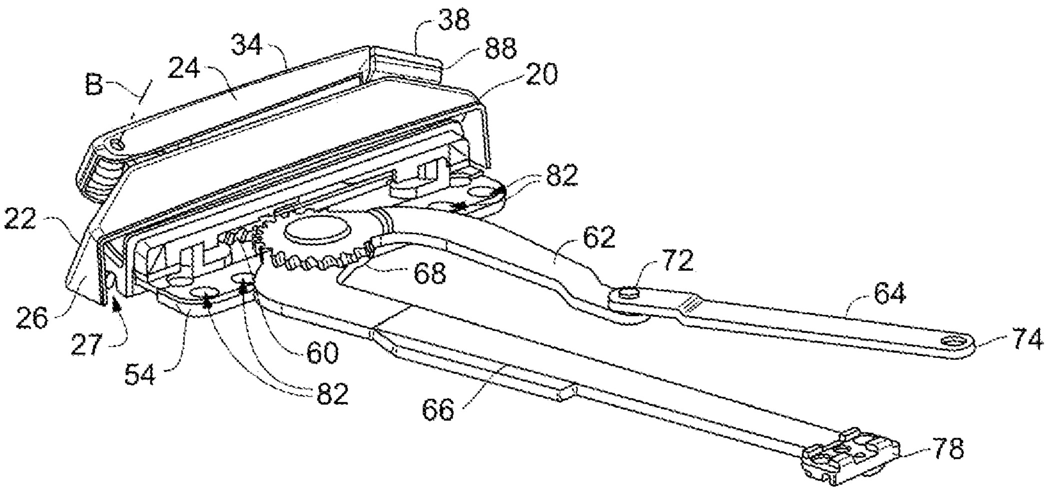
FIG. 3 is a rear isometric view of the operator cover and handle of FIG. 2, with the operator cover and handle attached to an operator.
Figure 4:
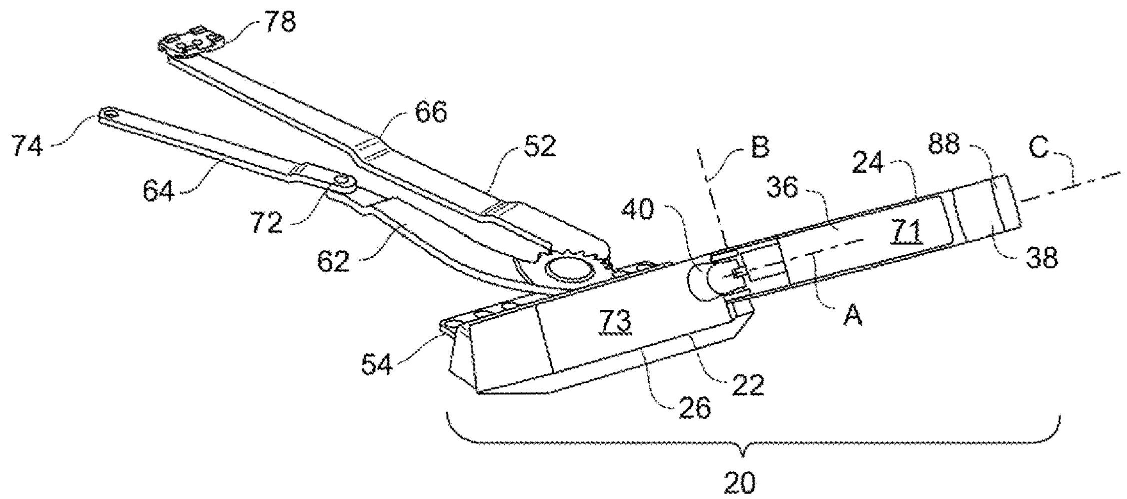
FIG. 4 is a front isometric view of the operator cover and handle of FIG. 2, with the operator cover and handle attached to an operator and with the handle in an unfolded position.
Figure 5:
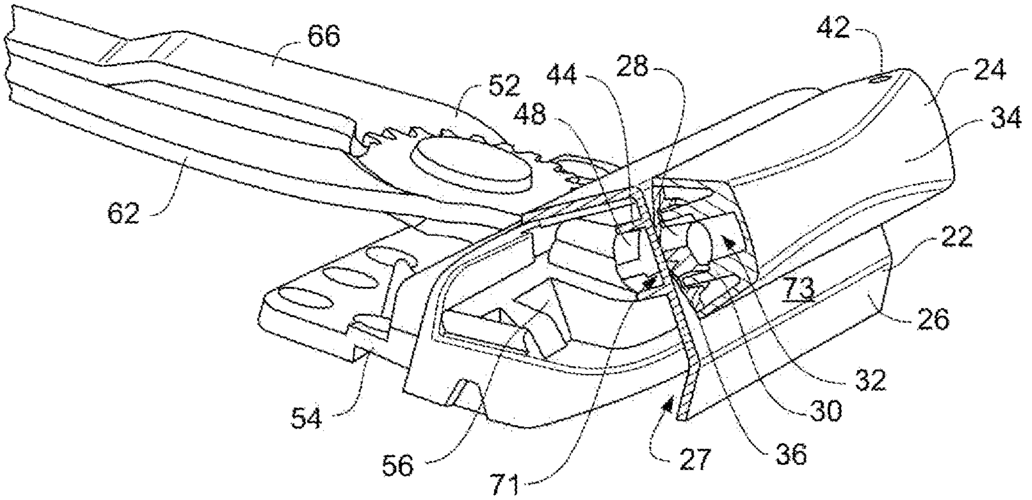
FIG. 5 is a front isometric view of the operator cover and handle of FIG. 2, with the operator cover and handle attached to an operator, and with the operator cover and handle depicted in cross-section.
Figure 6:
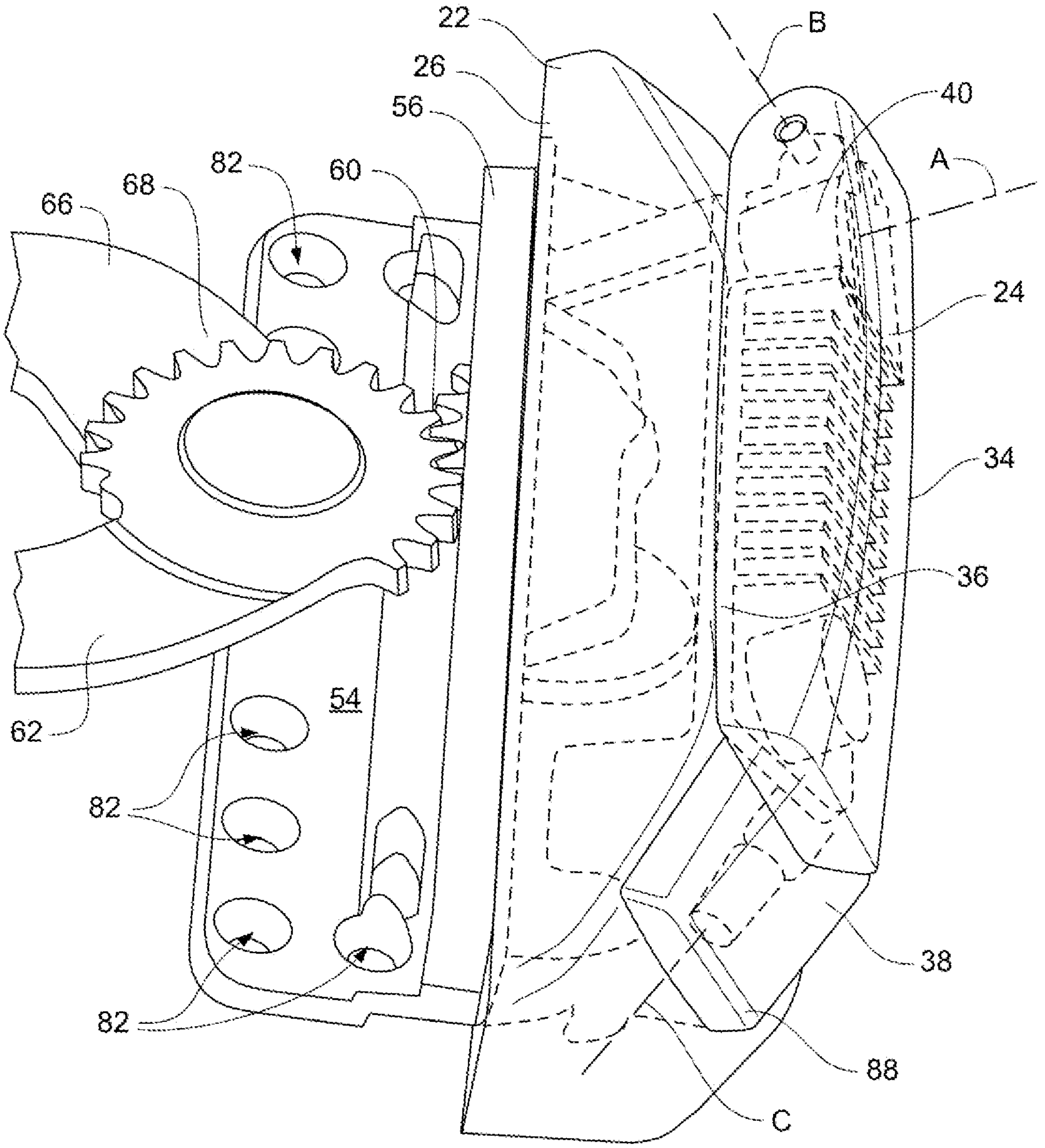
FIG. 6 is an isometric view of the operator cover and handle of FIG. 2, with the operator cover and handle attached to an operator, and with the exterior portions of the cover and handle depicted as transparent.
Figure 7:
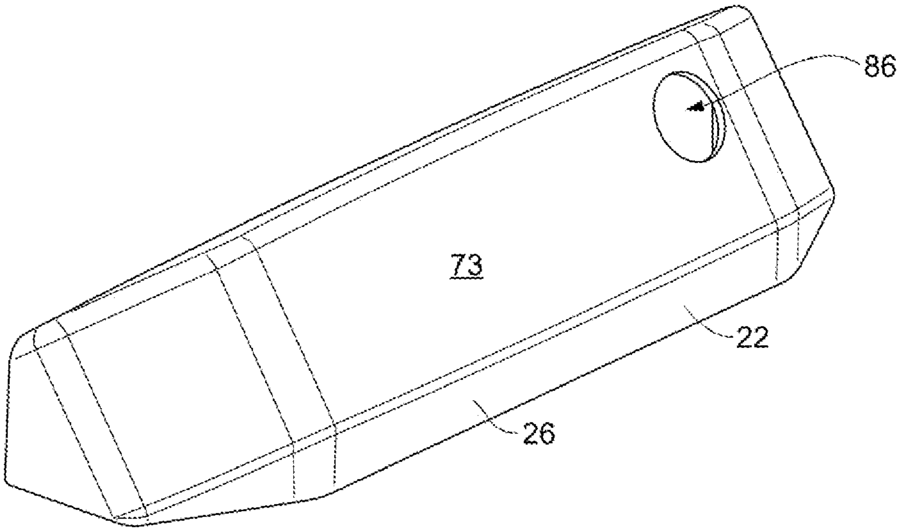
FIG. 7 is a front isometric view of the operator cover of FIG. 2.
Figure 8:
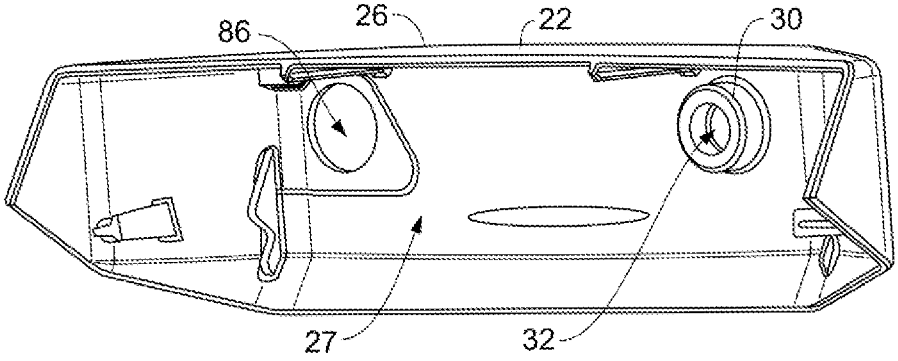
FIG. 8 is a rear isometric view of the operator cover of FIG. 2.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 9:
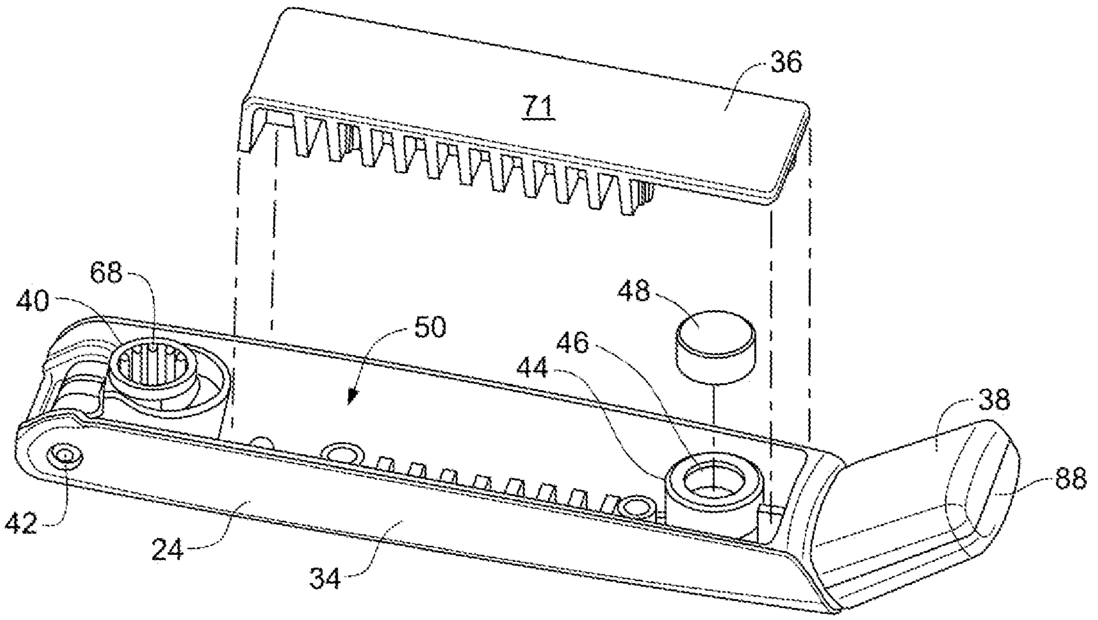
FIG. 9 is a partially exploded view of the handle of the operator cover and handle of FIG. 2.
Figure 10:
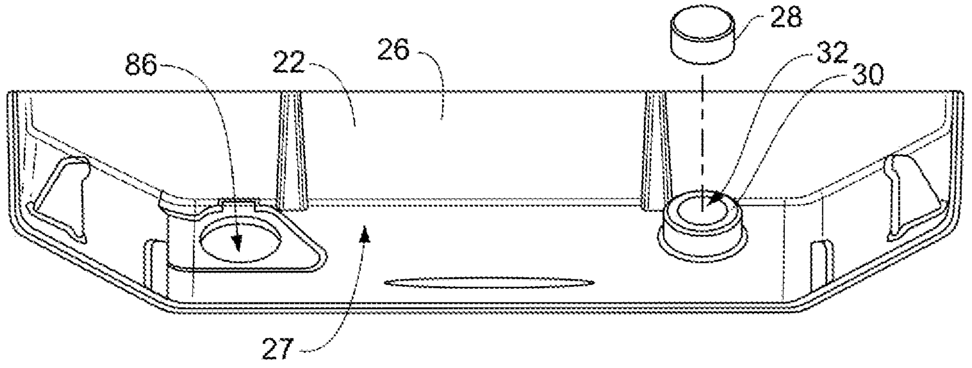
FIG. 10 is a partially exploded view of the cover of the operator cover and handle of FIG. 2.

There are depicted in FIGS. 2-12 embodiments of a window operator handle and cover assembly 20 according to embodiments of the invention. Operator handle and cover assembly 20 generally includes cover assembly 22 and handle assembly 24. As depicted in FIG. 10, cover assembly 22 generally includes shell 26 defining recess 27, and handle securing component 28. Shell 26 generally includes housing 30 inside recess 27, and defining cavity 32, which in turn receives magnetic handle securing component 28.

As depicted in FIG. 9, handle assembly 24 generally includes handle body 34, bottom cover insert 36, finger-grippable handle knob 38 which may be rotatable relative to handle body 34 about axis C, and operator drive interface 40 which is pivotally attached to handle body 34 with pin 42. Handle body 34 generally includes housing 44 defining cavity 46 which receives magnetic handle securing component 48. Bottom cover insert 36 can be snap-fitted to handle body 34 to cover recess 50 defined by handle body 34. Alternatively, bottom cover insert 36 can be attached with double-sided tape, adhesive, fasteners or any other suitable method.

In embodiments of the invention, both magnetic handle securing components 28, 48, may be mutually attracting magnets, or one or the other may be made of a ferrous metal capable of being attracted by a magnet, and the other a magnet. In preferred embodiments, the magnets used for handle securing components 28, 48, can be neodymium or other high magnetic strength disc magnets as are commonly available. Of course, it will be appreciated that handle securing components 28, 48, can be made from any other suitable magnetic materials or materials attracted to a magnet, and can be any suitable shape. Moreover, it will be appreciated that although magnetic handle securing components 28, 48, are described above as being received in recesses 32, 46, defined by housings 30, 44, they may also be otherwise attached to or molded in shell 26, handle body 34, or knob 38. Also, although only one each of magnetic handle securing components 28, 48, is depicted, it will be appreciated any number of pairs of magnetic handle securing components 28, 48, can be used. Still further, magnetic handle securing components 28, 48, may be mounted so as to be visible from the exterior when handle assembly 34 is in the unfolded position depicted in FIG. 4. Those skilled in the art will also appreciate that the overall magnetic force exerted by a magnet can be enhanced by a proximate, magnetically active, ferrous metal component. Hence, a separate magnetically active component, for example a piece of ferrous metal, could be added within, or proximate to, housings 30, 44, to enhance the magnetic effect of any magnet used as one of magnetic handle securing components 28, 48.

As depicted in FIGS. 2-6, 15, 17, and 18-20, operator cover and handle assembly 20 is attached to a window operator assembly 52. A typical dual-arm window operator assembly 52 is depicted in exemplary fashion in FIGS. 1, 2-6, 11, and 13, and generally includes base plate 54, gear housing 56, a rotatable drive in the form of worm gear 58, transfer gear 60, first arm 62, pivot arm 64, and second arm 66. First arm 62 has toothed portion 68 engaged with transfer gear 60, which is in turn engaged with worm gear 58. As will be known to those skilled in the art, second arm 66 is coupled to first arm 62 such that first arm 62 and second arm 66 pivot in opposite rotational directions as worm gear 58 is rotated. Gear housing 56 mates with base plate 54 to retain and cover worm gear 58 and transfer gear 60. Operator drive interface 40 has splines 67 which mate with splines 69 on shaft 70 of worm gear 58 so that worm gear 58 is rotatable using handle assembly 24. Pivot arm 64 is coupled to first arm 62 at pivot 72. Distal end 74 of pivot arm 64 is pivotally attached to window sash 76, and slide shoe 78 is pivotally attached to second arm 66. Slide shoe 78 is slidable in a track (not depicted) on window sash 76. Base plate 54 is secured to window frame 80 with fasteners (not depicted) received through apertures 82. Window sash 76 is coupled to window frame 80 with hinges (not depicted) so that window sash 76 can swing to open and close opening 84 defined by window frame 80. Hence, as handle assembly 24 is rotated by a user, window sash 76 is swung between open and closed positions.

Cover assembly 22 fits over and is secured to base plate 54 or gear housing 56 of window operator assembly 52 with shaft 70 of worm gear 58 extending through aperture 86 defined in cover assembly 22. As described above, operator drive interface 40 of handle assembly 24 is coupled to shaft 70 of worm gear 58 with splines 67, 69.

With handle assembly 24 in a folded position as depicted in FIGS. 2, 3, 5, and 6, lower surface 71 of handle assembly 24 abuts outer surface 73 of shell 26, and magnetic handle securing component 28 in cover assembly 22 is positioned proximate to magnetic handle securing component 48 in handle assembly 24. The mutual magnetic attraction between magnetic handle securing component 28 and magnetic handle securing component 48 secures handle assembly 24 in place. When it is desired to open or close window sash 76, distal end 88 of handle assembly 24 can be pulled outward, disengaging magnetic handle securing components 28, 48, and pivoting handle assembly 24 about axis B of pin 42 to dispose handle assembly 24 in the unfolded position depicted in FIG. 4. In this unfolded position, handle assembly 24 can be rotated in either direction about axis A, driving worm gear 58 to thereby open or close window sash 76. Once window sash 76 is in the desired position, handle assembly 24 can be rotated about axis B of pin 42 to return handle assembly 24 to the folded position depicted in FIG. 2, reengaging magnetic handle securing components 28, 48, and securing handle assembly 24 to cover assembly 22.

Moreover, in embodiments such as depicted in FIGS. 14-23, a detent mechanism 96 can be provided to enable handle assembly 24 to be retained in the unfolded position and to frictionally resist movement of the handle assembly between the folded and unfolded positions. Detent mechanism 96 generally includes cam 98 and spring 100. Cam 98 defines upper surface 102, flat portion 104, and aperture 106. Spring 100 generally includes body 108 defining aperture 110 and follower portion 112, which, as depicted, is slightly curved with respect to the remainder of body 108. Cam 98 is received in notch 114 defined in operator drive interface 40. Pin 42 is received through apertures 116, 118, of operator drive interface 40, and aperture 106 of cam 98 and is rotatable therein. Pin 42 is fixed to handle body 34 with splines 120.

Figure 14:
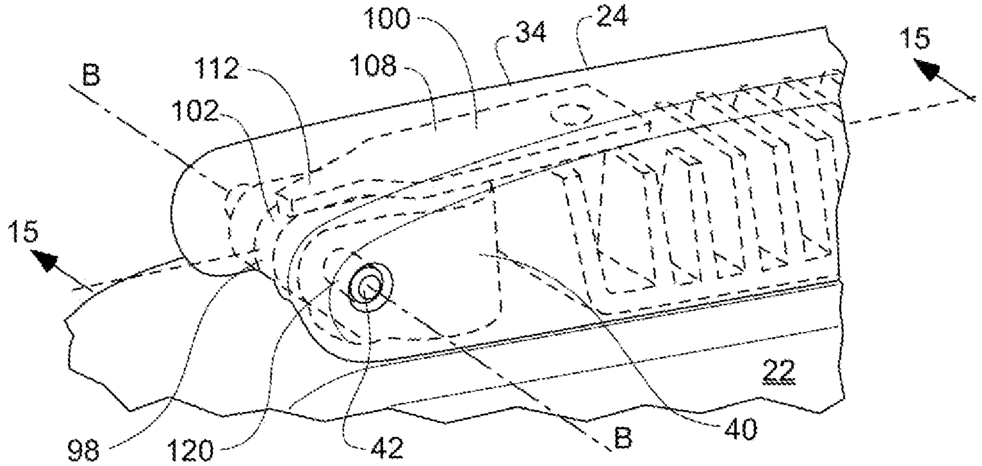
FIG. 14 is a partial isometric view of a handle detent mechanism according to embodiments of the invention, with the handle folded and depicted in phantom for clarity.
Figure 15:
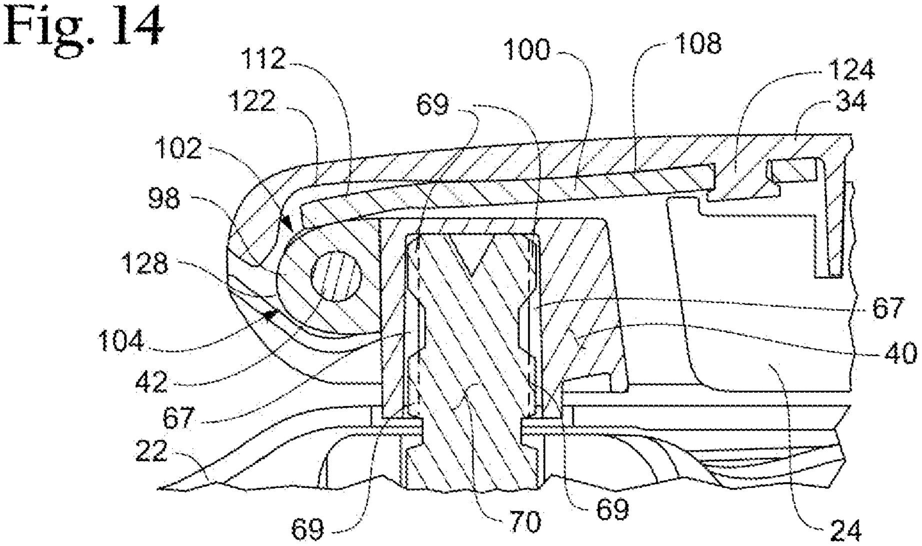
FIG. 15 is a cross-sectional view of the handle detent mechanism of FIG. 14 taken at section 15-15 of FIG. 14.
Figure 16:
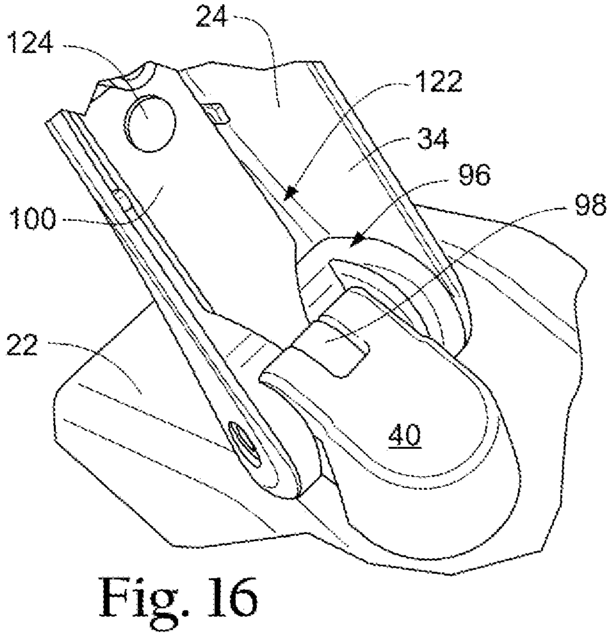
FIG. 16 is a partial isometric view of the handle detent mechanism of FIG. 14, with the handle in an unfolded position.
Figure 17:
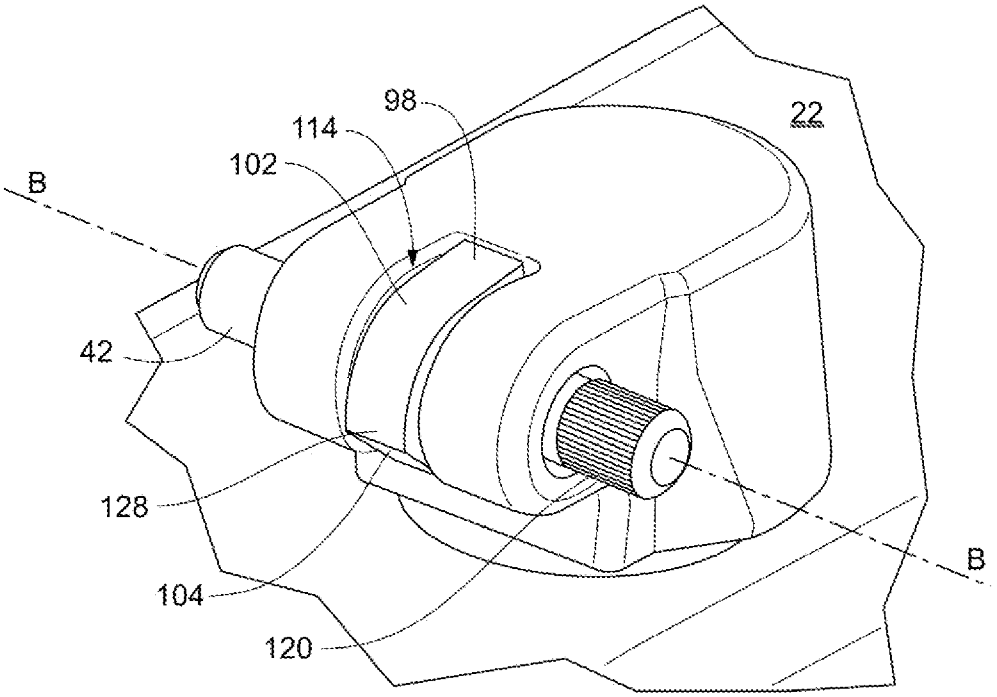
FIG. 17 is a partial isometric view of the operator drive interface of the handle detent mechanism of FIG. 14.
Figure 18:
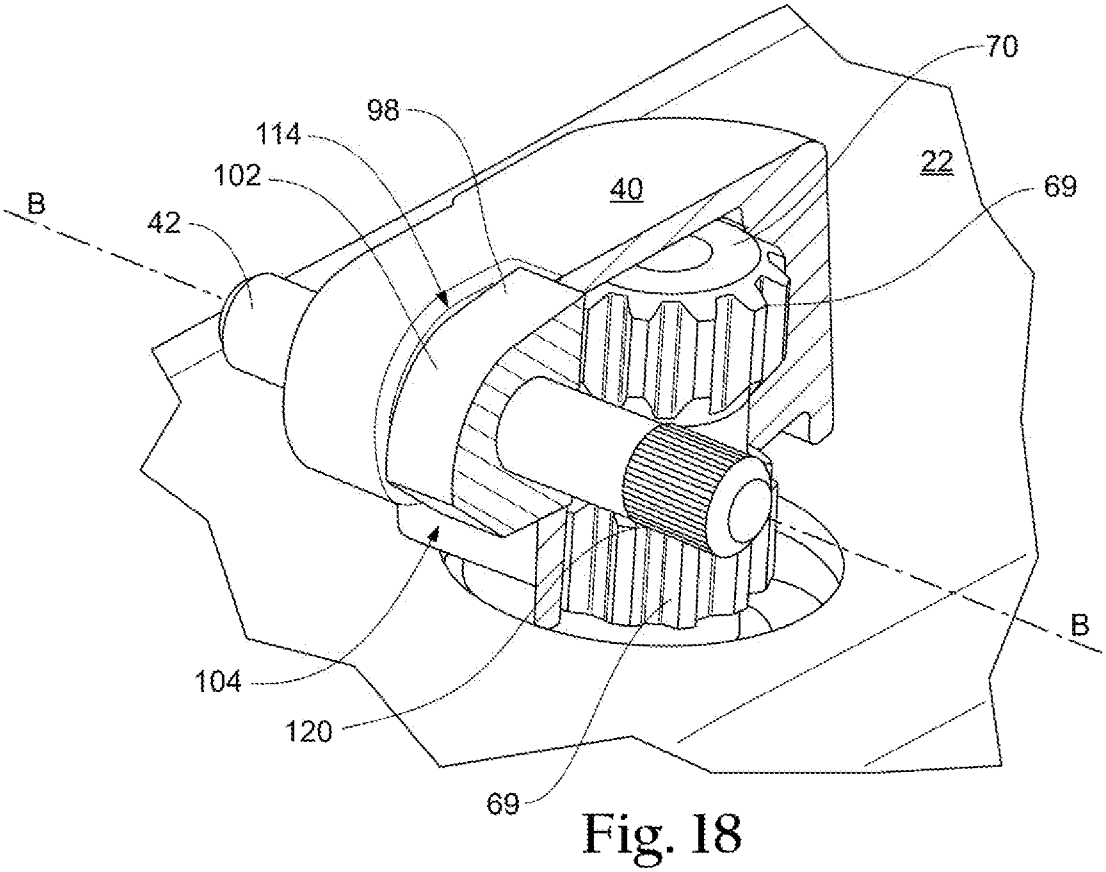
FIG. 18 is a partial cut-away view of the operator drive interface of FIG. 17.
Figure 19:
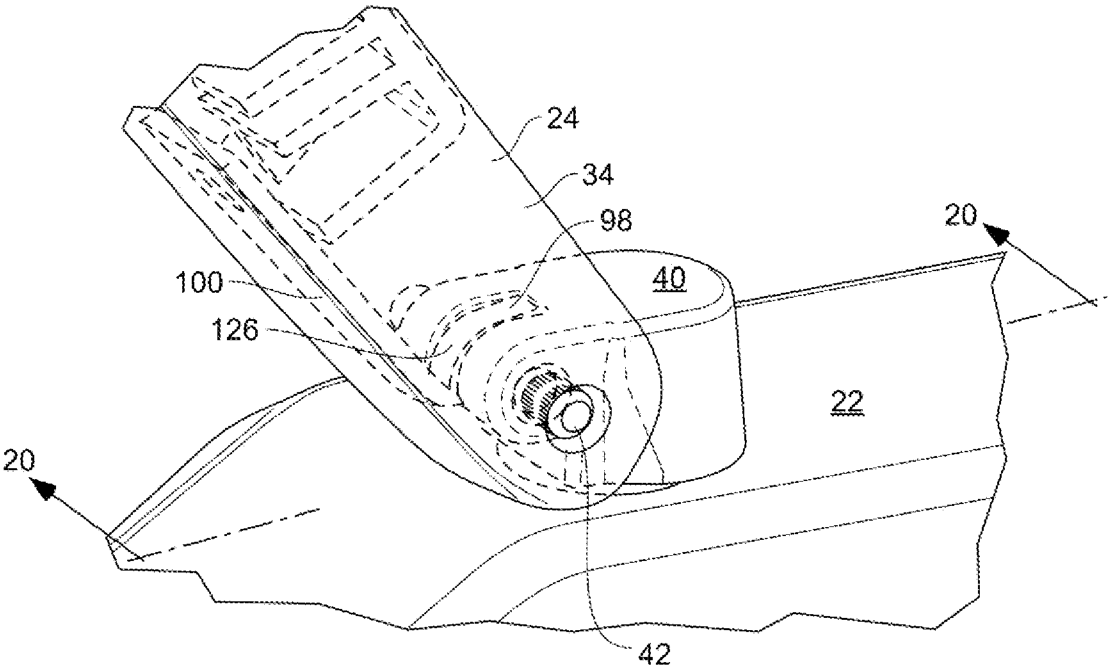
FIG. 19 is a partial isometric view of the handle detent mechanism of FIG. 14, with the handle unfolded and depicted in phantom for clarity.
Figure 20:
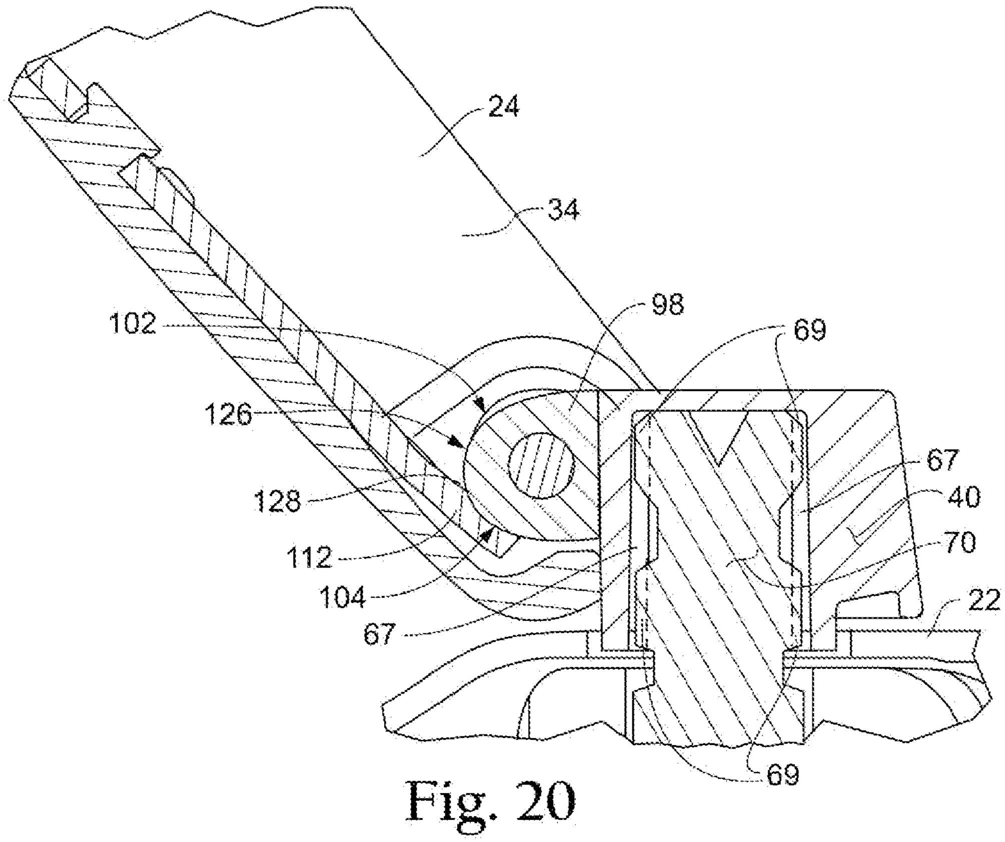
FIG. 20 is a cross-sectional view of the handle detent mechanism of FIG. 19 taken at section 20-20 of FIG. 19.
Figure 21:
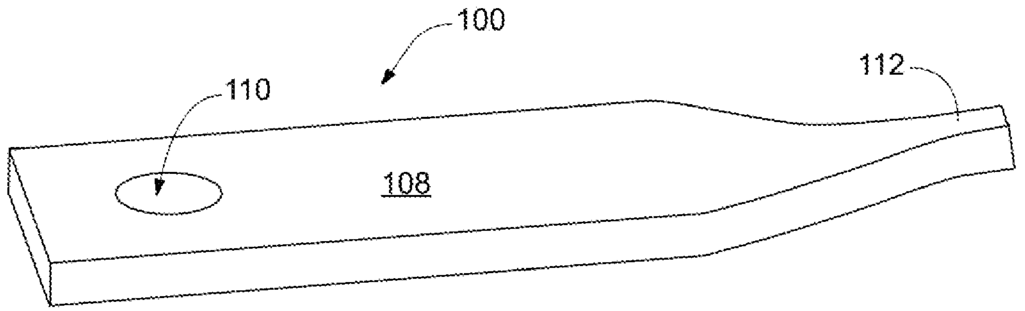
FIG. 21 is an isometric view of the spring of the handle decent mechanism of FIGS. 14-20.
Figure 22:
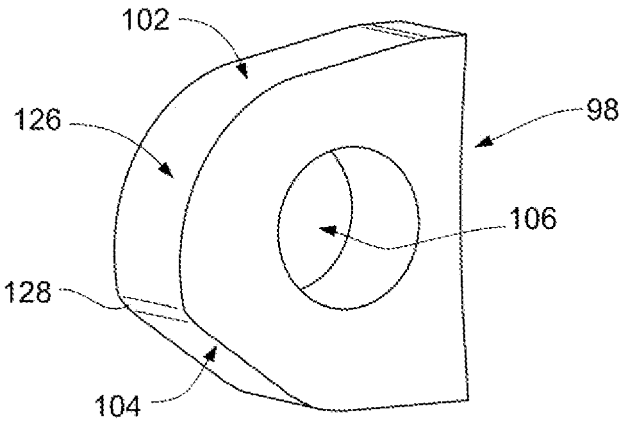
FIG. 22 is an isometric view of the cam of the handle detent mechanism of FIGS. 14-20.
Figure 23:
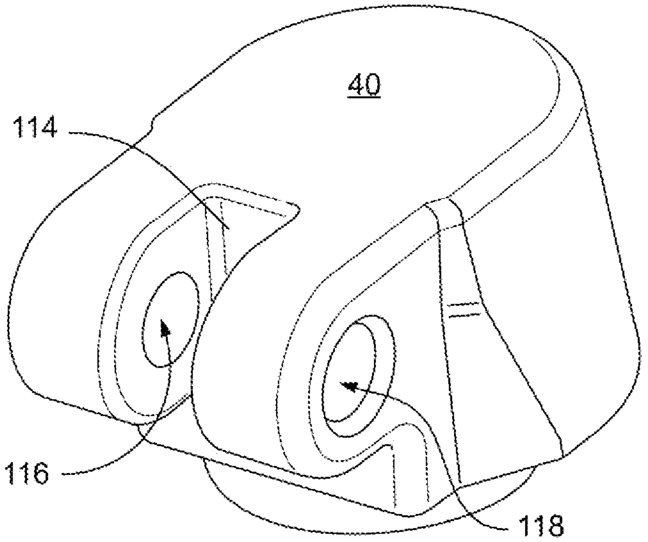
FIG. 23 is a top isometric view of the operator drive interface of FIGS. 17 and 18.
Figure 24:
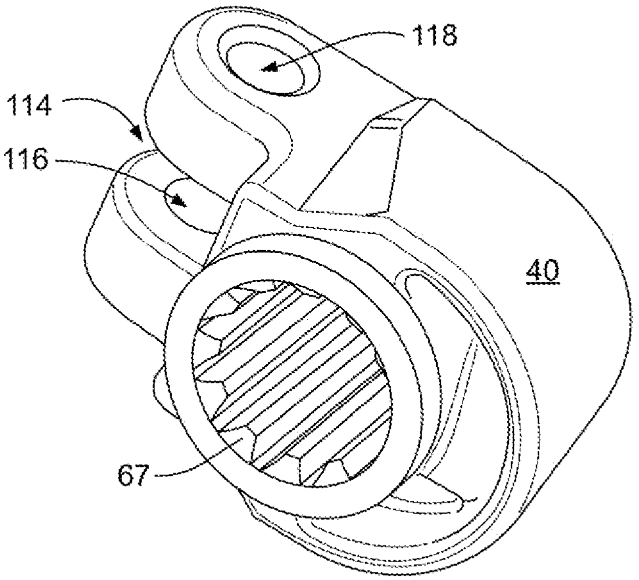
FIG. 24 is a bottom isometric view of the operator drive interface of FIGS. 17 and 18.
Figure 25:
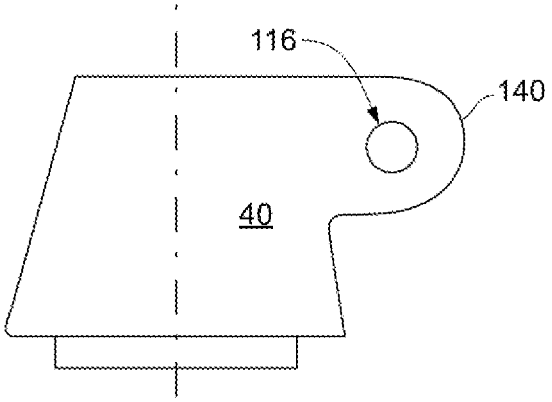
FIG. 25 is a side elevation view of an operator drive interface and detent mechanism assembly according to an alternative embodiment of the invention.
Figure 26:
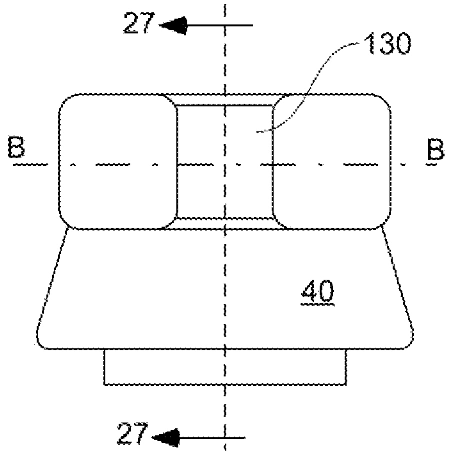
FIG. 26 is an end elevation view of the operator drive interface and detent mechanism assembly of FIG. 25.
Figure 27:
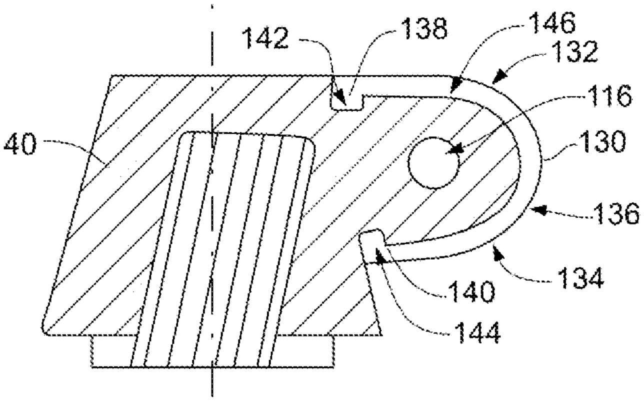
FIG. 27 is a cross-sectional view of the operator drive interface and detent mechanism assembly of FIGS. 25 and 26 taken at section 27-27 of FIG. 26.
Figure 28:
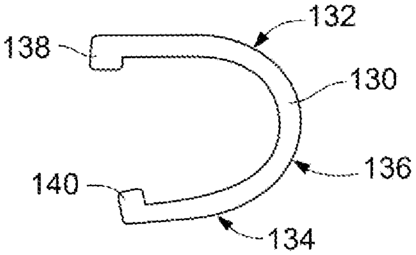
FIG. 28 is a side elevation view of the decent mechanism insert of the embodiment of FIGS. 25-27.

Spring 100 is received in recess 122 defined in handle body 34 and is secured in place with fastening projection 124 through aperture 110. In the folded position as depicted in FIGS. 14 and 15, follower portion 112 of spring 100 is biased against upper surface 102 of cam 98 to frictionally resist rotation of handle assembly 24 toward the unfolded position. As handle assembly 24 is shifted to the unfolded position by rotation about axis B, follower portion 112 slides over upper surface 102 of cam 98, including rounded portion 126, and the biasing force applied by spring 100, and friction between follower portion 112 and cam 98, steadily increases. As depicted in FIGS. 16, 19 and 20, once follower portion 112 passes ridge 128, follower portion 112 is biased against flat portion 104, where the bias applied by spring 100 tends to resist rotation of handle assembly 124 back toward the folded position of FIGS. 14 and 15. When handle assembly 24 is rotated toward the folded position, the bias applied by spring 100 against cam 98 steadily increases until follower portion passes ridge 128. Once past ridge 128, follower portion 112 rides along upper surface 102 of cam 98 until handle assembly 24 again reaches the folded position of FIGS. 14 and 15. Those skilled in the art will readily appreciate that detent mechanism 96 thus provides a detent stop tending to maintain handle assembly 24 in the unfolded position, as well as frictional resistance when handle assembly 24 is in the folded position, thereby inhibiting unintended or accidental folding or unfolding of handle assembly 24.

It will be appreciated by those skilled in the art that various alternative structures are possible to provide a detent mechanism 96 for handle assembly 24. For example, as depicted in FIGS. 25-28, cam 98 can be replaced with a hardened metal earn insert 130 for improved durability and wear characteristics. Cam insert 130 defines upper surface 132 and flat portion 134, which are separated by ridge 136. Inwardly directed projections 138, 140, fit into recesses 142, 144, respectively, to retain cam insert 130 on operator drive interface 40. Groove 146 can extend between recesses 142, 144, so that cam insert 130 is conformingly shaped and flush with nose portion 148 of operator drive interface 40. When used with spring 100, cam insert 130 functions similarly to cam 98 as previously described.

Figure 29:
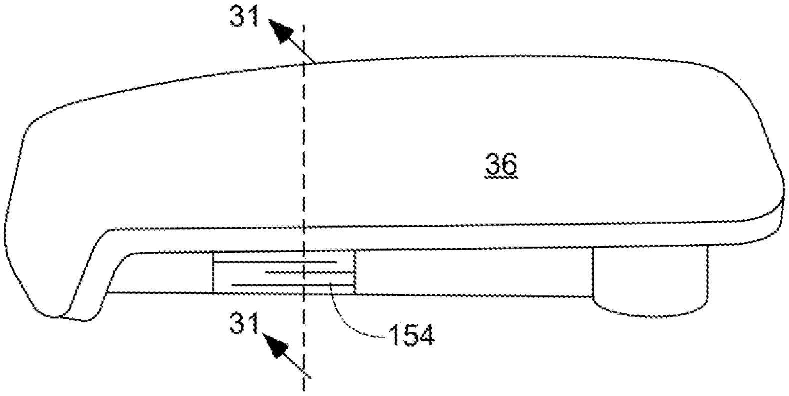
FIG. 29 is an isometric view of snap-in bottom cover insert according to an alternative embodiment of the invention.
Figure 30:
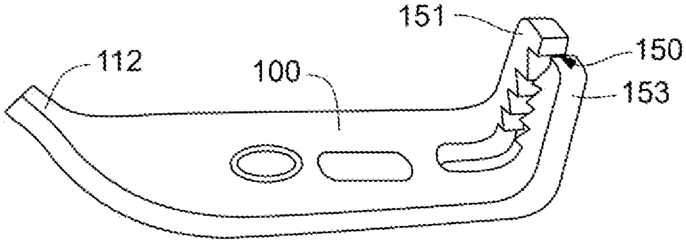
FIG. 30 is an isometric view of a detent mechanism spring receiving the insert of FIG. 29.
Figure 31:
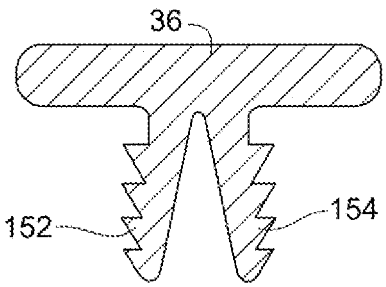
FIG. 31 is a cross-sectional view of the insert of FIG. 29, taken at section 31-31 of FIG. 29.

Moreover, as depicted in FIGS. 29-31, spring 100 can be provided with serrated notch 150 defined between legs 151, 153, which engages with serrated lower walls 152, 154, provided on bottom cover insert 36. With spring 100 affixed to handle body 34 as previously described, serrated lower walls 152, 154, can be advanced into serrated notch 150 to snap-fit bottom cover insert 36 to handle body 34. Those of skill in the art will of course appreciate that the serrated lower walls 152, 154, could be replaced by a single wall or that the geometry of the serrations could be reversed in direction on the bottom cover insert and spring to provide a similar effect.

Figure 32:
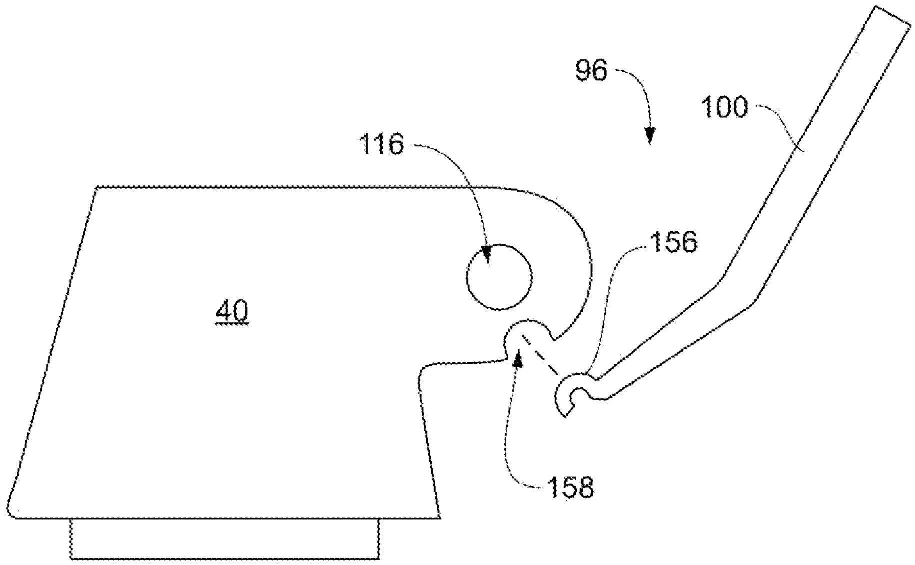
FIG. 32 is a side elevation view of an operator drive interface and detent mechanism spring according to an alternative embodiment of the invention.

Further, in another embodiment depicted in FIG. 32, follower 112 of spring 100 can be replaced with protrusion 156, with operator drive interface 40 defining conforming notch 158. In this embodiment, handle assembly 24 can be retained in the unfolded position through the engagement of protrusion 156 in notch 158.

Figure 11:
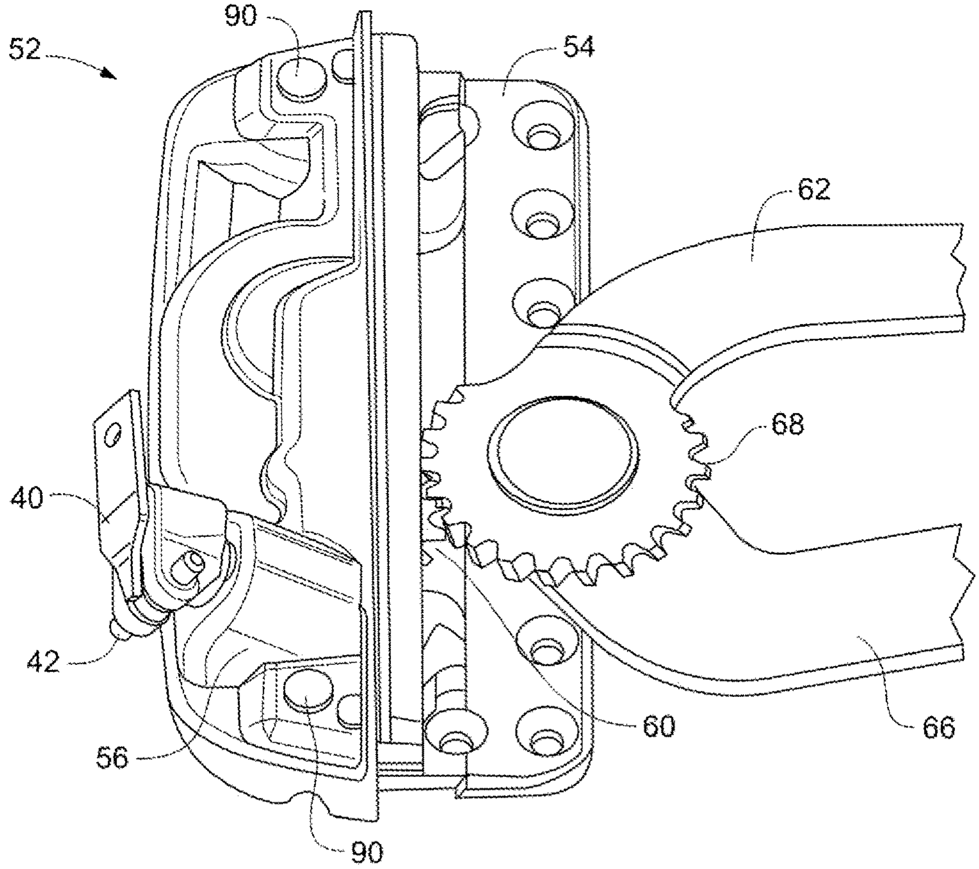
FIG. 11 is an isometric view of an operator according to an embodiment of the invention with the operator cover and handle omitted for clarity.
Figure 12:
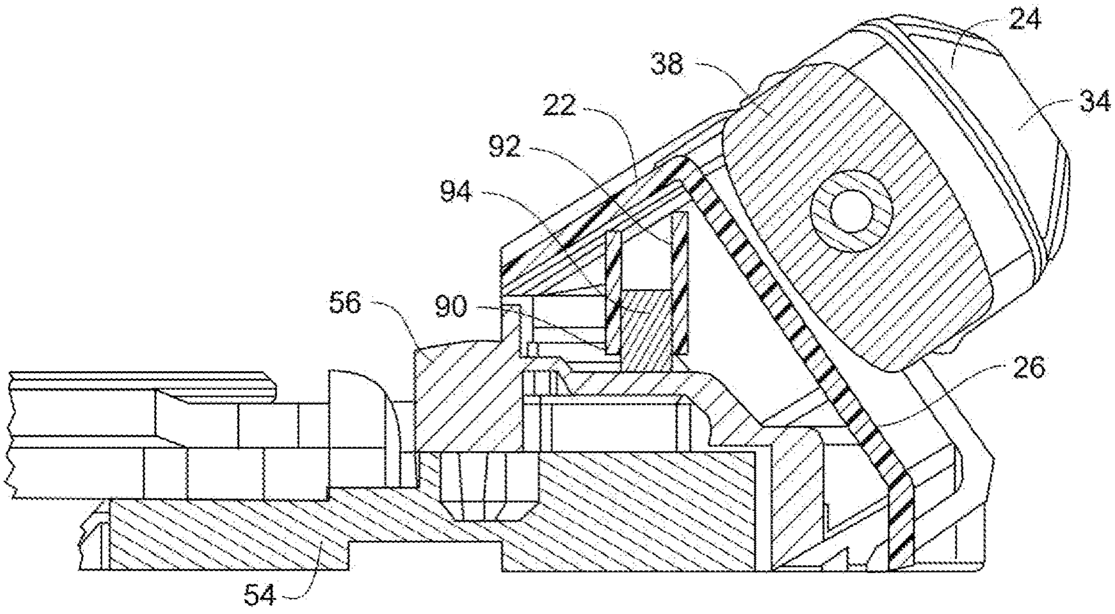
FIG. 12 is a cross-sectional view of an operator cover and handle according to an embodiment of the invention, depicting a magnetic attachment feature for the operator cover.
Figure 13:
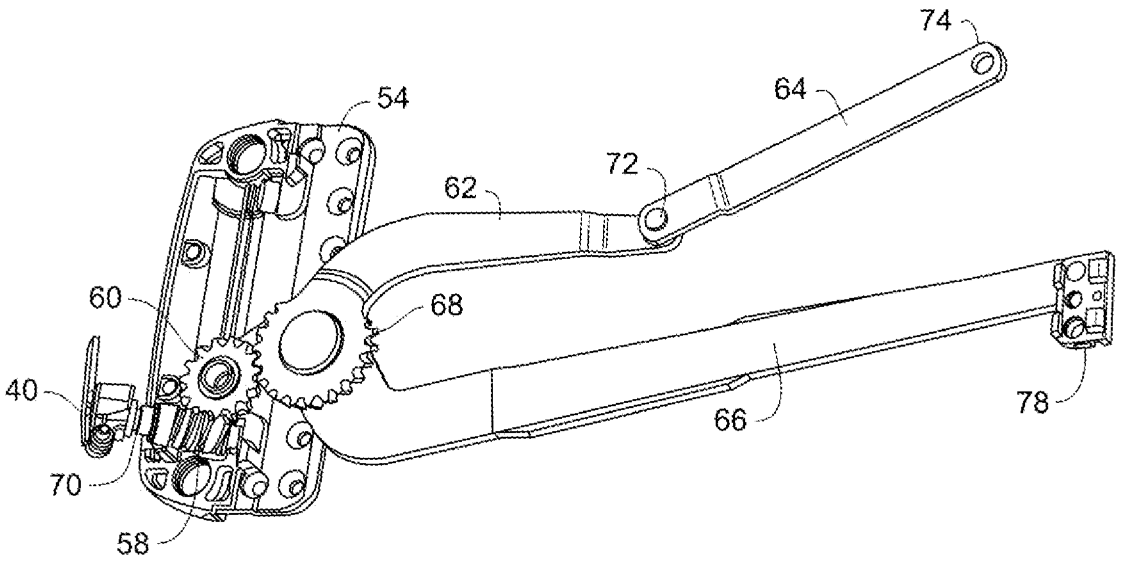
FIG. 13 is a partial isometric view of the window operator depicted in FIG. 2.

Optionally, as depicted in FIGS. 11 and 12, cover assembly 22 can also be secured in place on window operator assembly 52 with magnetic features. In the depicted embodiment, window operator assembly 52 has magnetic cover securing components 90 disposed on window operator assembly 52. Cover assembly 22 has housings 92, positioned so as to correspond to magnetic cover securing components 90. Each of housings 92 receives a magnetic cover securing component 94. Again, magnetic cover securing components 90, 94, may be mutually attracting magnets, or one or the other may be made of a ferrous metal capable of being attracted by a magnet, and the other a magnet. Through the mutual attraction of magnetic cover securing components 90, 94, cover assembly 22 can be held securely in place on operator assembly 52. When it is desired to remove cover assembly 22, cover assembly 22 can be simply lifted upwardly to disengage magnetic cover securing components 90, 94. It will be appreciated by those of skill in the art that these magnetic cover securing components 90, 94 can be located and selected so that cover assembly 22 will not be unintentionally dislodged from window operator assembly 52 due to routine operation and maintenance of window operator handle and cover assembly 20. Again, those skilled in the art will also appreciate that the overall magnetic three exerted by a magnet can be enhanced by a proximate, magnetically active, ferrous metal component. Hence, a separate magnetically active component, for example a piece of ferrous metal, could be added within, or proximate to, housings 92 or magnetic cover securing components 90, to enhance the magnetic effect of any magnet used as one of magnetic handle securing components 90, 92.

It will be appreciated that although a dual-arm type operator is depicted, operator handle and cover assembly 20 can be adapted for use with any type or configuration of window operator. Moreover, although a casement window is depicted, the operator handle and cover assembly 20 can be used with any other type of window, for ample awning style windows.

Hence, it will be appreciated that, by positioning a pair of magnets or a magnet and matching ferrous metal component on or in cover assembly 22 and a corresponding magnet and matching ferrous metal component in or on handle assembly 24, the handle securing components 28, 48, interact, helping to position and secure the handle assembly 24 in a folded position. without the need for projections, notches, or recesses on cover assembly 22 to engage with handle assembly 24. As described, handle securing components 28, 48, can be attached inside cover assembly 22 and handle assembly 48, respectively, or molded into cover assembly 22 and handle assembly 48 for improved aesthetics and functionality. It will be appreciated that there may be an additional advantage to using a ferrous metal component for handle securing component 28 (rather than a magnet) to avoid attraction of metal particles or dust which may abrade and damage the finish of shell 26 over time. Similarly, cover assembly 22 can be secured to window operator assembly 52 with strategically located magnetic cover securing components 90, 94, to improve serviceability of window operator assembly 52.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A window operator handle and cover assembly comprising:

a shell adapted to be received on a window operator, the shell having a first magnetic handle securing component;

a handle assembly comprising:

a handle body; and an operator drive interface adapted to couple with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position; and a detent mechanism operably coupled with the operator drive interface and the handle body, the detent mechanism providing a detent stop to maintain the handle assembly in the unfolded position, wherein the detent mechanism comprises a cam operably coupled to the operator drive interface and a spring operably coupled to the handle body, wherein the cam defines an upper surface and a flat portion with a ridge separating the upper surface and flat portion, wherein the spring presents a follower portion, and wherein the spring biases the follower portion against the upper surface of the cam when the handle body is in the folded position, and the spring biases the follower portion against the flat portion of the cam when the handle body is in the unfolded position.

2. The window operator handle and cover assembly of claim 1, wherein the spring is received in a recess defined in the handle body.

3. The window operator handle and cover assembly of claim 1, wherein the operator drive interface defines a notch and the cam is received in the notch.

4. The window operator handle and cover assembly of claim 1, wherein the handle body defines a recess, and the handle assembly further includes a bottom cover insert received in the recess.

5. The window operator handle and cover assembly of claim 4, wherein the spring defines a serrated notch, the bottom cover insert has a pair of serrated lower walls, and the bottom cover insert is attached to the spring and handle body by engagement of the serrated lower walls with the serrated notch.

6. The window operator handle and cover assembly of claim 1, wherein the rotatable drive presents a splined shaft and the operator drive interface defines a splined recess engaged with the splined shaft.

7. The window operator handle and cover assembly of claim 1, wherein the handle body and the operator drive interface are coupled with a pin.

8. A window operator handle and cover assembly comprising:

a shell adapted to be received on a window operator, the shell having a first magnetic handle securing component;

a handle assembly comprising:

a handle body; and an operator drive interface adapted to couple with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position; and a detent mechanism operably coupled with the operator drive interface and the handle body, the detent mechanism providing a detent stop to maintain the handle assembly in the unfolded position, wherein the detent mechanism comprises a cam operably coupled to the operator drive interface and a spring operably coupled to the handle body, wherein the cam is a cam insert defining an upper surface and a flat portion with a ridge separating the upper surface and flat portion, the cam insert having a pair of projections with each one of the projections being received in a separate one of a pair of recesses defined in the operator drive interface, wherein the spring presents a follower portion, and wherein the spring biases the follower portion against the upper surface of the cam insert when the handle body is in the folded position, and the spring biases the follower portion against the flat portion of the cam insert when the handle body is in the unfolded position.

9. The window operator handle and cover assembly of claim 8, wherein the handle body defines a recess, and the handle assembly further includes a bottom cover insert received in the recess.

10. The window operator handle and cover assembly of claim 9, wherein the spring defines a serrated notch, the bottom cover insert has a pair of serrated lower walls, and the bottom cover insert is attached to the spring and handle body by engagement of the serrated lower walls with the serrated notch.

11. A window operator handle and cover assembly comprising:

a shell adapted to be received on a window operator, the shell having a first magnetic handle securing component;

a handle assembly comprising:

a handle body; and an operator drive interface adapted to couple with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position; and a detent mechanism operably coupled with the operator drive interface and the handle body, the detent mechanism providing a detent stop to maintain the handle assembly in the unfolded position, wherein the detent mechanism comprises a notch in the operator drive interface and a spring operably coupled to the handle body, the spring having a protrusion engaged in the notch when the handle assembly is in the unfolded position.

12. A window operator assembly comprising:

a window operator adapted to couple with a movable sash of a window; and a window operator handle and cover assembly comprising:

a shell adapted to be received on a window operator, the shell having a first magnetic handle securing component;

a handle assembly comprising:

a handle body; and an operator drive interface coupled with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position; and, a detent mechanism operably coupled with the operator drive interface and the handle body, the detent mechanism providing a detent stop to maintain the handle assembly in the unfolded position, wherein the detent mechanism comprises a cam operably coupled to the operator drive interface and a spring operably coupled to the handle body, wherein the cam defines an upper surface and a flat portion with a ridge separating the upper surface and flat portion, wherein the spring presents a follower portion, and wherein the spring biases the follower portion against the upper surface of the cam when the handle body is in the folded position, and the spring biases the follower portion against the flat portion of the cam when the handle body is in the unfolded position.

13. The window operator assembly of claim 12, wherein the spring is received in a recess defined in the handle body.

14. The window operator assembly of claim 12, wherein the operator drive interface defines a notch and the cam is received in the notch.

15. The window operator assembly of claim 12, wherein the handle body defines a recess, and the handle assembly further includes a bottom cover insert received in the recess.

16. The window operator assembly of claim 15, wherein the spring defines a serrated notch, the bottom cover insert has a pair of serrated lower walls, and the bottom cover insert is attached to the spring and handle body by engagement of the serrated lower walls with the serrated notch.

17. The window operator assembly of claim 12, wherein the rotatable drive presents a splined shaft and the operator drive interface defines a splined recess engaged with the splined shaft.

18. The window operator assembly of claim 12, wherein the handle body and the operator drive interface are coupled with a pin.

19. A window operator assembly comprising:

a window operator adapted to couple with a movable sash of a window; and a window operator handle and cover assembly comprising:

a shell adapted to be received on a window operator, the shell having a first magnetic handle securing component;

a handle assembly comprising:

a handle body; and an operator drive interface coupled with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position; and, a detent mechanism operably coupled with the operator drive interface and the handle body, the detent mechanism providing a detent stop to maintain the handle assembly in the unfolded position, wherein the detent mechanism comprises a cam operably coupled to the operator drive interface and a spring operably coupled to the handle body, wherein the earn is a cam insert defining an upper surface and a flat portion with a ridge separating the upper surface and flat portion, the cam insert having a pair of projections with each one of the projections being received in a separate one of a pair of recesses defined in the operator drive interface, wherein the spring presents a follower portion, and wherein the spring biases the follower portion against the upper surface of the cam insert when the handle body is in the folded position, and the spring biases the follower portion against the flat portion of the cam insert when the handle body is in the unfolded position.

20. The window operator assembly of claim 19, wherein the handle body defines a recess, and the handle assembly further includes a bottom cover insert received in the recess.

21. The window operator assembly of claim 20, wherein the spring defines a serrated notch, the bottom cover insert has a pair of serrated lower walls, and the bottom cover insert is attached to the spring and handle body by engagement of the serrated lower walls with the serrated notch.

22. A window operator assembly comprising:

a window operator adapted to couple with a movable sash of a window; and a window operator handle and cover assembly comprising:

a shell adapted to be received on a window operator, the shell having a first magnetic handle securing component;

a handle assembly comprising:

a handle body; and an operator drive interface coupled with a rotatable drive of the window operator, the handle body pivotally coupled with the operator drive interface, wherein the handle portion is shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position; and, a detent mechanism operably coupled with the operator drive interface and the handle body, the detent mechanism providing a detent stop to maintain the handle assembly in the unfolded position, wherein the detent mechanism comprises a notch in the operator drive interface and a spring operably coupled to the handle body, the spring having a protrusion engaged in the notch when the handle assembly is in the unfolded position.

* * * * *